US011468175B2

(12) United States Patent
Banga

(10) Patent No.: US 11,468,175 B2
(45) Date of Patent: Oct. 11, 2022

(54) CACHING FOR HIGH-PERFORMANCE WEB APPLICATIONS

(71) Applicant: salesforce.com, inc., San Francisco, CA (US)

(72) Inventor: Shrey Banga, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 318 days.

(21) Appl. No.: 16/528,571

(22) Filed: Jul. 31, 2019

(65) Prior Publication Data

US 2021/0034760 A1 Feb. 4, 2021

(51) Int. Cl.
*G06F 21/60* (2013.01)
*G06F 16/957* (2019.01)
*G06F 21/31* (2013.01)

(52) U.S. Cl.
CPC ........ *G06F 21/602* (2013.01); *G06F 16/9574* (2019.01); *G06F 21/31* (2013.01)

(58) Field of Classification Search
CPC .... G06F 21/602; G06F 16/9574; G06F 21/31; G06F 2221/2143; G06F 21/6245; H04L 67/141; H04L 63/06; H04L 67/02; H04L 67/146; H04L 63/10
See application file for complete search history.

(56) References Cited

U.S. PATENT DOCUMENTS

| | | | | |
|---|---|---|---|---|
| 7,827,184 B2 * | 11/2010 | Zhang | ................. | G06F 16/9535 707/750 |
| 8,478,881 B2 * | 7/2013 | Berry | ..................... | H04L 67/01 709/227 |
| 8,949,887 B2 * | 2/2015 | Mehta | ................ | H04N 21/6408 725/34 |
| 9,215,424 B2 * | 12/2015 | Bappu | .................. | H04N 21/632 |
| 10,977,598 B1 * | 4/2021 | Peng | .................... | G06Q 10/105 |
| 2007/0195692 A1 * | 8/2007 | Hagglund | ........... | G06F 11/2058 370/216 |
| 2008/0229021 A1 * | 9/2008 | Plamondon | ............. | H04L 67/56 711/125 |
| 2008/0256050 A1 * | 10/2008 | Zhang | ................. | G06F 16/9535 707/999.005 |
| 2009/0171754 A1 * | 7/2009 | Kane | .................... | G06F 16/9535 715/744 |
| 2013/0110637 A1 * | 5/2013 | Bott | ................... | G06Q 30/0244 705/14.64 |

(Continued)

*Primary Examiner* — Sanchit K Sarker
(74) *Attorney, Agent, or Firm* — Butzel Long; Donald J. Lecher

(57) ABSTRACT

A system can provide a web browser application that generates a request for a data object to a server. The system can include a syncer delegate that intercepts the request from the web browser application and determines whether the requested data object is available in a cache memory. If the data object is available in the cache memory, the requested data object is transferred from the memory to the web browser application and the request is forwarded to a server over a network. If the data object is not available in the cache memory, the request is forwarded to a server over a network. The server can transfer the data object over the network to the syncer delegate, which can provide the data object to the web browser application and update the cache with the newly-received data object.

20 Claims, 6 Drawing Sheets

(56) References Cited

U.S. PATENT DOCUMENTS

| | | | |
|---|---|---|---|
| 2013/0152088 A1* | 6/2013 | Gkantsidis | G06F 16/24 |
| | | | 707/693 |
| 2015/0213134 A1* | 7/2015 | Nie | H04L 67/2876 |
| | | | 707/770 |
| 2015/0256641 A1* | 9/2015 | Agarwal | H04L 67/04 |
| | | | 709/203 |
| 2016/0359856 A1* | 12/2016 | Wang | H04L 63/0435 |
| 2017/0163694 A1* | 6/2017 | Skuratovich | H04L 67/5651 |

* cited by examiner

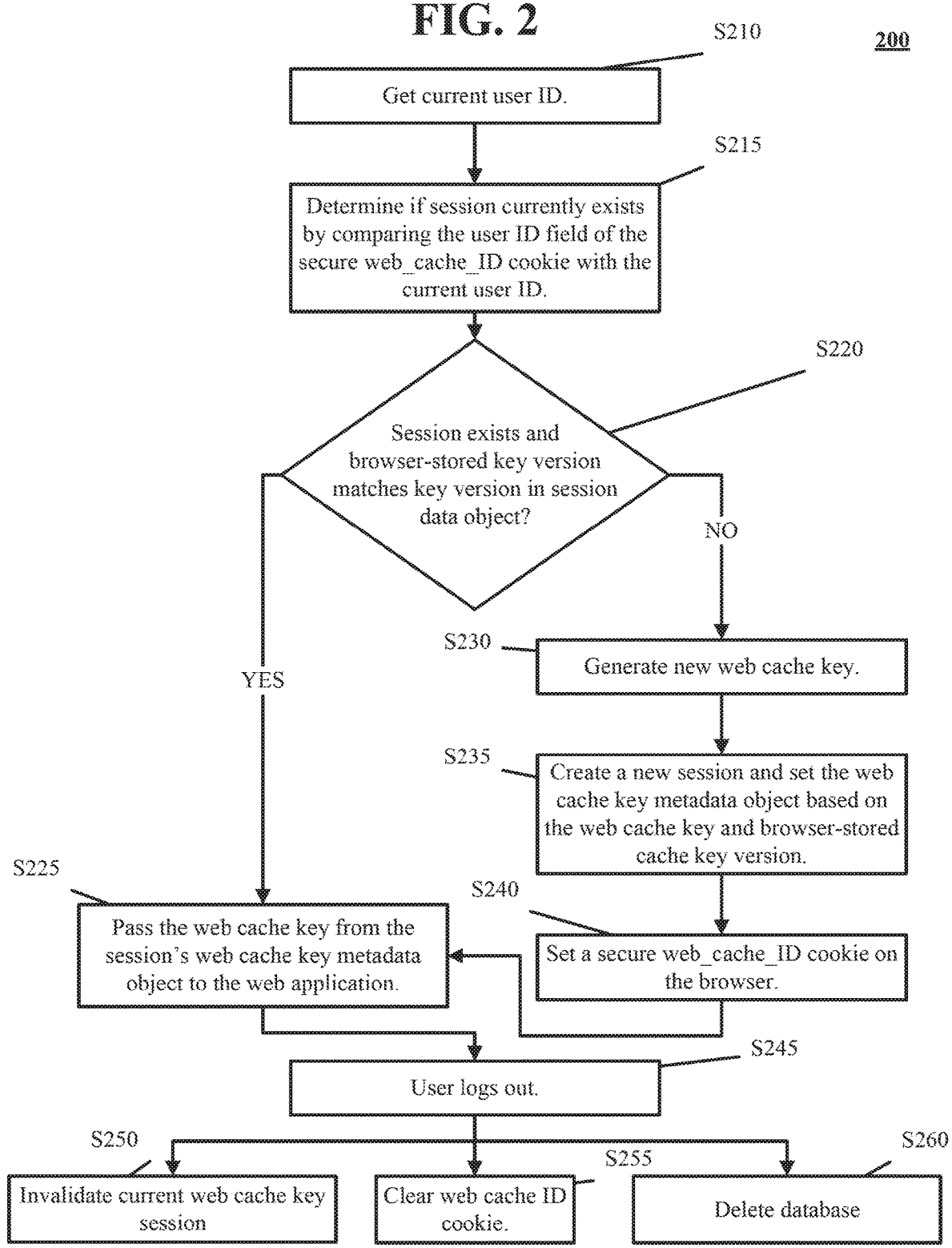

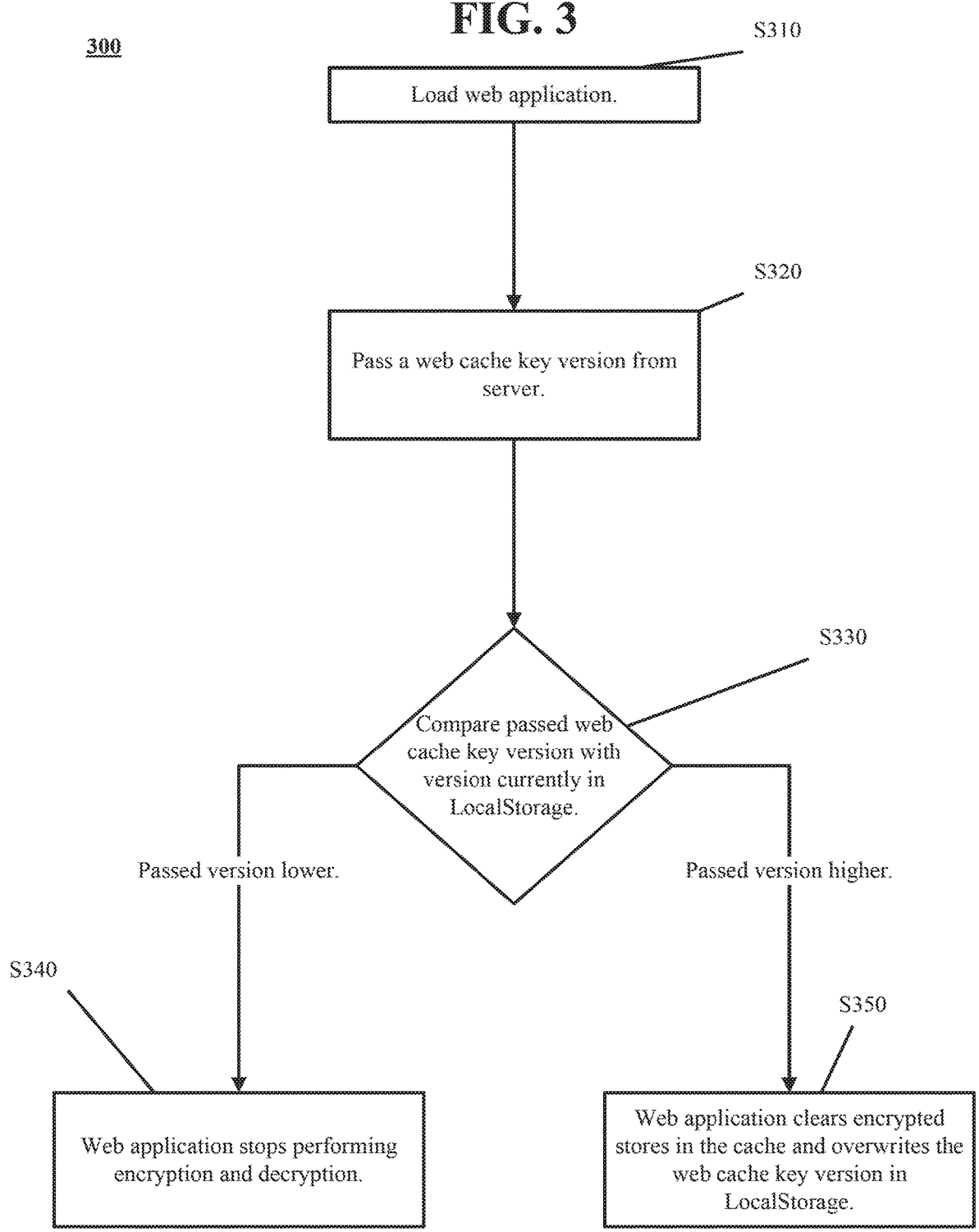

Session Data Object 400

Browser Cookie 450

CACHING FOR HIGH-PERFORMANCE WEB APPLICATIONS

BACKGROUND

Applications that execute in a web browser environment may transfer data between a local machine and one or more servers upon initialization. Depending on the amount of data to be transferred, launch of the application may be delayed until the transfer is complete. Once launched, various actions performed using the application may cause additional data transfers, delaying visual presentation of the data, and reducing the responsiveness of the application. Launching the application in a new, second browser window may also cause the initial data transfer to occur, even though the data may have already been retrieved due to the previously-launched browser window. Delays incurred while using a web application due to data transfers may inconvenience users and reduce productivity.

Multi-tenant cloud-based architectures may improve collaboration, integration, and community-based cooperation between tenants without sacrificing data security. In a multi-tenant system, a hardware and software platform may simultaneously support multiple tenants from a common data store. Each tenant may be assigned to a virtual environment that corresponds to a dedicated portion of the common data store. A tenant may be, for example, a user, a group of users, a website, a mobile application, an e-commerce store, an application programming interface (API), or the like. Multi-tenant architectures may allow for execution of applications within a common processing space, thereby simplifying access to specific sets of data for any tenant or user. Similarly, applications and services may be more easily shared between multiple tenants.

BRIEF SUMMARY

According to an embodiment of the disclosed subject matter, a system for caching data may be provided and may include a data source, a processor, and a memory in communication with the processor. The memory may be configured to store a plurality of instructions executable by the processor to cause the system to provide a web browser application. The web browser application may be configured to generate a request for a data object to the data source. The memory may store a plurality of syncer delegate instructions executable by the processor to cause the system to intercept the request from the web browser application. Instructions may be further included to determine whether the requested data object is available in the memory. Instructions may be further included to provide the requested data object from the memory to the web browser application. Instructions may be further included to forward the request to the data source via the network. Instructions may be further included to receive the requested data object from the data source via the network. Instructions may be further included to provide the received data object to the web browser application and to store the received data object in the memory. The memory may be further configured to store a version attribute for each data object stored in the memory. The request may further include a request for a plurality of data objects. Instructions may be further included to include a plurality of first version attributes for the plurality of requested data objects in the request forwarded to the data source via the network. Instructions may be further included to receive only those requested data objects from the data source that may have a second version attribute that indicates a same or newer version than the first version attribute. Instructions may be further included to generate an encryption key. Instructions may be further included to create a session, the session associated with a session data object that stores the encryption key, a session identifier, and a version attribute that may identify a version of the encryption key. Instructions may be further included to generate a browser cookie. The browser cookie may include a user ID field that identifies a current user and a session ID field including the session identifier. Instructions may be further included to transfer the encryption key from the session data object to the web browser application and to encrypt the received data object using the encryption key prior to storing the received data object in the memory. Instructions may be further included to generate an encryption key. Instructions may be further included to determine that a user ID of a current user of the web browser application matches the user ID field. Instructions may be further included to determine that a first version attribute of a session data object that identifies a version of an encryption key matches a second version attribute that identifies a current version of the encryption key, the second version attribute stored in a data store of the web browser application and to transfer the encryption key to the web browser application. The data source may be configured to transmit a first encryption key version attribute of an encryption key. Instructions may be further included to compare the first encryption key version attribute with a second encryption key version attribute. The second encryption key version attribute may be stored in a data store of the web browser application. Instructions may be further included to determine that the first encryption key version attribute reflects a more recent version of the encryption key than the second encryption key version attribute. Instructions may be further included to overwrite the second encryption key version attribute with the first encryption key version attribute. Instructions may be further included to erase a data object encrypted using the encryption key associated with the first encryption key version attribute from the memory. Instructions may be further included to generate a browser cookie, the browser cookie comprising a timestamp that indicates when the memory was last updated and to defer data reads from the data source based on the timestamp. The web browser application may further include a first web browser application and a second web browser application. Instructions may be further included to determine that at least one of the first web browser application and the second web browser application are not currently visible to a user of the system. Instructions may be further included to deny access to the memory for a request generated by at least one of the first web browser application and the second web browser application that are not currently visible to the user of the system.

According to an embodiment of the disclosed subject matter, a method may include intercepting a request for a data object from a web browser application to a data source, determining whether the requested data object is available in a memory of a computerized device on which the web browser is operating, providing the requested data object from the memory to the web browser application, forwarding the request to the data source via a computerized communications network, receiving the requested data object from the data source via the computerized communications network, providing the received data object to the web browser application, storing the received data object in the memory. The memory may be configured to store a version attribute for each data object stored in the memory. The request may further include a request for a plurality of data objects. The method may further include including a plurality of first version attributes for the plurality of requested data objects in the request forwarded to the data source via the computerized communications network and receiving only those requested data objects from the data source having a second version attribute that indicates a same or newer version than the first version attribute. The method may further include generating an encryption key and creating a session. The session may be associated with a session data object that stores the encryption key, a session identifier, and a version attribute that identifies a version of the encryption key. The method may further include generating a browser cookie. The browser cookie may include a user ID field that identifies a current user and a session ID field including the session identifier. The method may further include transferring the encryption key from the session data object to the web browser application and encrypting the received data object using the encryption key prior to storing the received data object in the memory. The method may further include generating an encryption key, determining that a user ID of a current user of the web browser application matches the user ID field, and determining that a first version attribute of a session data object that identifies a version of an encryption key matches a second version attribute that identifies a current version of the encryption key. The second version attribute may be stored in a data store of the web browser application. The method may further include transferring the encryption key to the web browser application. The method may further include transmitting a first encryption key attribute of an encryption key and comparing the first encryption key version attribute with a second encryption key version attribute. The second encryption key version attribute may be stored in a data store of the web browser application. The method may further include determining that the first encryption key version attribute reflects a more recent version of the encryption key than the second encryption key version attribute, overwriting the second encryption key version attribute with the first encryption key version attribute, and erasing a data object encrypted using the encryption key associated with the first encryption key version attribute from the memory. The method may further include generating a browser cookie. The browser cookie may include a timestamp that indicates when the memory was last updated. The method may further include deferring data reads from the data source based on the timestamp. The web browser application may further include a first web browser application and a second web browser application. The method may further include determining that at least one of the first web browser application and the second web browser application are not currently visible to a user of the system and denying access to the memory for a request generated by at least one of the first web browser application and the second web browser application that may not currently visible to the user of the system.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 2 illustrates a flow diagram of a method according to an embodiment of the disclosed subject matter.

FIG. 3 illustrates a flow diagram of a method according to an embodiment of the disclosed subject matter.

DETAILED DESCRIPTION

As previously discussed, web-based applications may transfer data between a local machine and one or more data stores located within one or more servers via a network. During the data transfer, the initialization of the web application may be delayed, transactions may be postponed, and/or views of the data may be empty, thereby inconveniencing and frustrating the user, as well as reducing productivity. Furthermore, some web applications may repeatedly request data from a remote server even when it may be available from a conventional local cache, such as where the same web application is open in multiple tabs of a single web browser and data needed by one tab are already displayed in another. The present subject matter may reduce delays incurred in transferring data by caching the data within a local memory accessible by the web browser, in ways that may prevent repeated transfers and other inefficiencies common in conventional caching techniques. Embodiments disclosed herein also may allow for a local cache to be kept up to date based upon data obtained from a remote server, while decreasing or eliminating delay experienced by a user of a web application that accesses the cache.

It should be appreciated that throughout the specification, a server may refer to one or more servers, and a data store may refer to one or more data stores. In the subsequent discussion, a single server 110 may be referred to by example, but either of servers 110 or 115 may be substituted without departing the scope of the present subject matter. Similarly, data stores 111 and 116 are shown within each of servers 110 and 115 for the purpose of simplifying the discussion, but it should be understood that data retrieved in response to a request from client device 105 may be sourced from a data store 111/116 located within the server or otherwise available to the server via a network connection, through another server, routing device, bridge, and the like.

Figure 1:
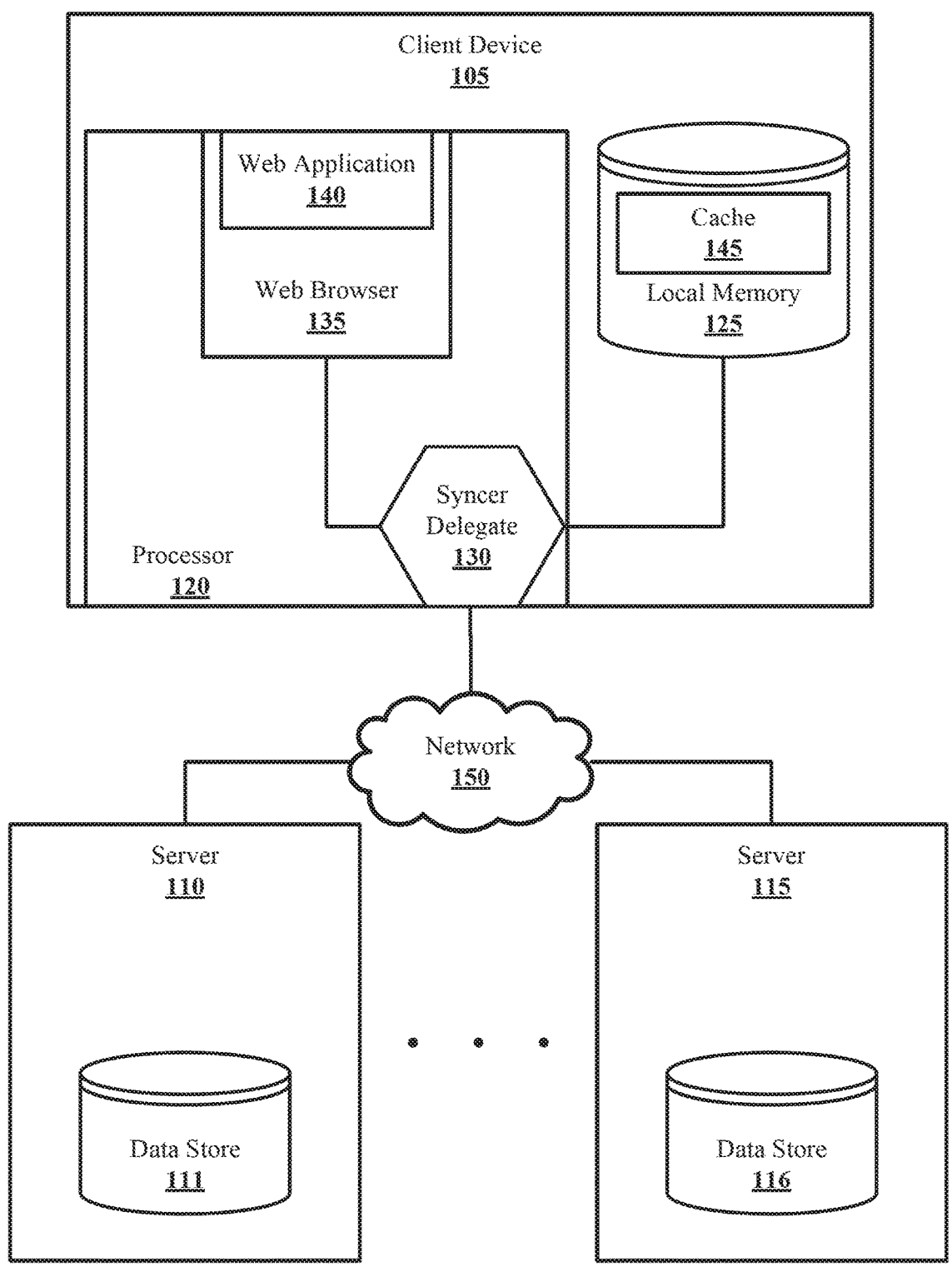
FIG. 1 illustrates an example of a system according to an embodiment of the disclosed subject matter.

FIG. 1 illustrates a block diagram of an example system 100 that supports caching in accordance with various aspects of the present disclosure. System 100 may include a cache 145 that may be implemented within local memory 125 using a database. When requested by a web application 140 executing within a web browser 135 of a client device 105, data that may be found in the cache 145 may be returned more quickly than if the data is obtained via a data store 111 of server 110 over a network 150. In this way, the responsiveness of the web application 140 may be improved. For example, navigating to different views based on the requested data within the web application 140 may occur more quickly. When data is requested, the web application 140 may load the data from the cache 145 and display it near-immediately while simultaneously or near-simultaneously requesting the same data from the server 110. The user may be notified that the data objects currently shown may be stale until it is known whether the server possesses an updated version of the data objects. Should the data from the server 110 be newer than the data stored in the cache 145, the cache 145 may be updated to reflect the changes as well as refreshed in the web application 140. Data cached in the local memory 125 may allow a user to continue using the web application 140 while offline, even if in a limited manner, until the network 150 connection becomes available. The cache 145 may also be used by web application 140 to store data object snapshots, or backup copies stored at various intervals, during editing. The snapshots may then be requested from the cache 145 in the event that a user wishes to compare versions of the same data object or restore a deleted data object, for example.

Data that is cached from a user's web browser 135 may be at increased risk for compromise due to its greater persistence. The cached data may therefore be made more secure by encrypting and decrypting as needed using the processor 120 and using an encryption key specific to a current user session. If the user ends the session, or the encryption key is otherwise lost or invalidated, the cached data may become irretrievable.

The web application 140 may be deployed across one or more tabs of a web browser 135. While each tab may execute its own instance of the web application 140, all instances of the web application 140 across all tabs of the web browser 135 may share the same cache 145. With each request for data from each instance of the web application 140, the cache 145 may be updated with based on the data retrieved from data store 111 of server 110. Where one or more instances of the web application 140 request the same data, the cache 145 may be updated redundantly with the same data, which may reduce the performance of the web application 140, the web browser 135, and the overall system 100. Additionally, the time needed to receive data in response to a request from a multiple instances of web application 140 across multiple tabs may vary. In an example, one server 110 may be more computationally-taxed than another server 115 and respond more slowly to a request for data. Alternatively, or in addition, network congestion may increase the time needed for data to be retrieved in response to one data request versus another data request.

It may be possible for an instance of a web application 140 to receive stale data from a server 110 and to attempt to update the cache 145 with stale data. This issue may be addressed in several ways. In an example solution, the system 100 may store a version value for each data object and checking the version value prior to updating the cache 145. The version value may be increased with each update to the data object(s). When an instance of the web application 140 attempts to write old data to the cache 145, the write may be ignored or rejected based on a comparison between the version value of the data object stored in the cache 145 and the version value of the same data object for which the write is being attempted. Alternatively, or in addition, a singular instance of multiple instances of the web application 140 may be periodically and exclusively designated to update the cache 145. The designation may be made based on assessing the utilization of the web application 140 instance, based on seniority, randomly, or the like. Alternatively, or in addition, a locking scheme may be implemented where a single tab of the plurality of web browser tabs in which a web application 140 instance is executing may hold a lock on the entire database for a period of time before releasing it. During the time in which any one web browser tab holds the lock, only the associated instance of the web application 140 may be used to update the cache 145. Alternatively, or in addition, a syncer delegate 130, implemented using processor 120 of the client device 105, for example, may be assigned to process all cache updates. In each of the three aforementioned solutions, the designated entity may perform the comparison before allowing an update to the cache 145 based on the version value as previously described, thus preventing old data from be written to the cache 145.

A database may be used to implement the cache 145. In an embodiment the database may be constructed using the IndexedDB application programming interface (API). More generally, any suitable local database or other data store may be used. When the database is first created, a version attribute may be set to an initial value. Should the database be updated, such as to change the way data is stored, for example, the database version attribute may be incremented to enable all other systems and services that access the database to determine whether an incompatibility may exist and may prompt the user or system administrator to update to the newer version. Where the database is updated, web browser tabs containing an instance of the executing web application 140 using the older database version may block newly-opened tabs and the associated web application 140 instances from accessing the database. To address this issue, the web browser tabs using the older version of the database may be automatically closed when an update to the database is determined. This determination may be made via a received event or by polling the database, for example. Alternatively, or in addition, the web browser tabs still using the older version of the database may be refreshed or reloaded to use the new version of the database if there is no unsaved information within the associated instance of the web application 140. The database may operate according to a same-origin principle, where it may not be accessed from any other application having a different origin or domain, using a different port, or using a different protocol than the domain, port, and protocol in which it was created.

The client device 105, including the web application 140, syncer delegate 130, processor 120, and all other components having access to the cache 145 may encrypt all values prior to writing to the cache 145 and decrypt all values when reading from the cache 145. The encryption key may not be derived purely from data available to the web application 140, such as a session browser cookie. A session browser cookie may allow a web application 140 or web page to maintain information about the user and may persist for the duration of the session. A browser cookie, as used herein and as commonly used in the art, refers to a limited web browser data store. A browser cookie may be limited to a size of four kilobytes, for example. As used herein, a session refers to an interaction between a user and a web application 140 and may be associated with one or more data structures for storing data during the interaction. A session may begin when a user launches the web application 140 via the web browser 135 and may end when the user logs out of the web application 140, or the for example. Alternatively, or in addition, server 110 may end a session. Merely closing the web browser 135 or closing a web browser tab executing an instance of web application 140 may not end a session. In an embodiment, data generated during a session is only visible from within the session and is not available from other sessions. A session may be associated with a session data structure that may contain data relevant to the session. For example, a session data structure may contain a user identifier, user name, session identifier, timestamp, metadata data object including an encryption key and a version attribute, and any other information that may be relevant during the session to avoid repetitive or redundant entry of data, for example. In an embodiment, a session data structure may save a user's user ID when connected to a server via the web browser to avoid prompting the user to enter his or her user ID each time a new web page is loaded. Data generated during an instance of a web application 140 executing within a web browser 135 tab may only be visible within the web browser tab in which it was created. Similarly, the encryption key should be linked to a session, such that it is invalidated when the session ends. The encryption key may not be stored on any persistent storage on the client except in a memory during the time in which the web browser tab executing the web application 140 instance remains open. The encryption key may be invalidated when the user logs out of the web application 140, closes the associated web browser tab, and/or closes the web browser 135. The encryption key may not be invalidated if a user having multiple accounts switches accounts. The encryption key may not be invalidated if the user's session browser cookie expires. Any encryption key may be invalidated immediately by a server 110 with which the web application 140 connects with and retrieves data. Upon logging in to the web application 140 by the client, the server 110 may initialize the web application 140 by transmitting a key. The key received from server 110 may be converted by web application 140 to an alternative format. In an embodiment, web application 140 may convert the key received from the server 110 from a raw string format into a binary format that may be compatible with a cryptography API that may be utilized by web application 140 to access cache 145.

Figure 4A:
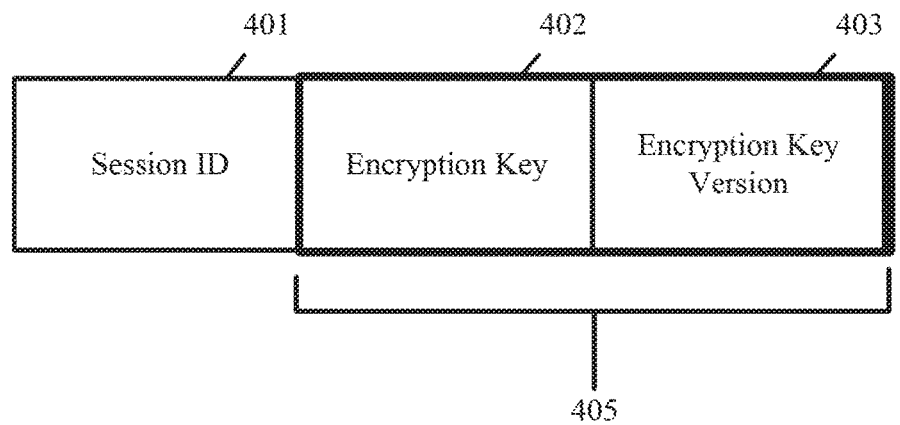
FIGS. 4A and 4B illustrate examples of data structures according to an embodiment of the disclosed subject matter.
Figure 4B:
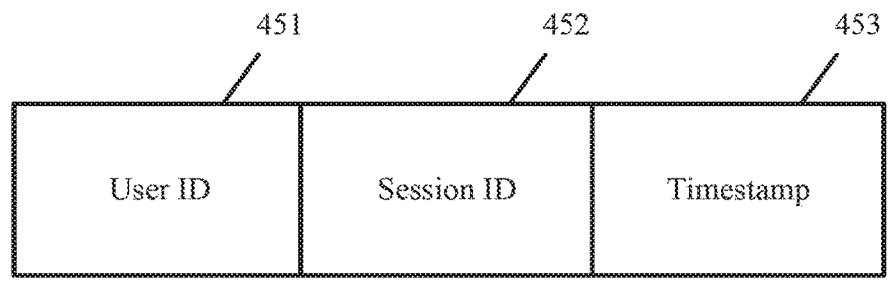

The encryption key used by the web application 140 for accessing the cache 145 may be aptly termed the "web cache key." Like the database, the web cache key may have a version attribute set to an initial value when created. A web_cache_key session type may be defined. The session may be associated with a session data object 400 as shown in FIG. 4A that may include one or more fields storing a session identifier 401 and a metadata object 405 that may store the web cache key 402 and a version attribute 403 for the web cache key. Web cache key 402 may be encrypted itself within the session data object 400 in order to prevent an attacker who succeeds in gaining access to any of data stores 125, 111, 116 from obtaining and using web cache key 402. A browser cookie 450 may be defined as shown in FIG. 4B and may include a user identifier field 451 identifying the associated user and a value field 452 identifying a session ID. The browser cookie 450 may be created upon launching the web application 140.

FIG. 2 is a flow diagram illustrating an example of a method 200 that may be performed by processor 120 to utilize the web cache key when a logged-in user of web application 140 makes a request. As further described in the subsequent discussion, the syncer delegate 130 may intercept requests from web application 140 to determine whether the request may be fulfilled by the cache 145. Upon making the request, processor 120 may obtain the current user ID upon which the request by web application 140 was based in S210. In S215, a current web_cache_key session, if one exists, may be found by comparing the current user ID with the user ID field 451 of the browser cookie 450. In S220, if a matching user ID is found in the user ID field 451 of browser cookie 450, the associated session ID field 452 may be used to index into the session ID field 401 of the session data object 400. The version attribute 403 may then be compared with a browser-stored cache key version value. The browser-stored cache key version value may be stored in Local Storage of web browser 135, described further in the subsequent discussion. The browser-store cache key version value may be dynamically updated to reflect the latest version of the web cache key and may be changed at any time for any reason. If the browser-stored cache key version value is changed, all instances of the web application requesting access to the cache 145 will fail the test in S220 and proceed with generating a new web cache key in S230. Additionally, the current data contents of cache 145 may become invalid.

Continuing with reference to FIG. 2, if the encryption key version attribute 403 of the session data object 400 matches the browser-stored cache key version value, as determined in S220, then the web cache key 402 may be passed from the web_cache_key session metadata object 405 to the web application 140 in S225. The web application 140 may then make requests to cache 145 using the web cache key 402. If a web_cache_key session is not found with a matching user ID 451 in the browser cookie 450, or if the version attribute 403 of the web_cache_key session data object 400 does not match the browser-stored cache key version value in S220, then a new web cache key 402 may be generated in S230 along with a corresponding version attribute 403 of the web cache key 402. A new web_cache_key session may be created in S235 for the user, and the metadata object 405 of the web_cache_key session data object 400 may be set based on the web cache key generated in S230 and the current browser-stored cache key version value. In S240, the browser cookie 450 may be set using the web browser 135 with the session ID field 452 of the browser cookie 450 identifying the newly created session identifier of the web_cache_key session data object 400, and the user ID field 451 of the browser cookie 450 identifying the current user. Following S240, the method moves to S225, where the web cache key 402 may be passed from the web_cache_key session metadata object 405 to the web application 140. The user may inevitably log out in S245, at which time the web_cache_key session may be invalidated in S250, the browser cookie 450 may be cleared in S255, and the database, if used to implement the cache 145, may be deleted in S260.

The web cache key 402 may be changed at any time. FIG. 3 is a flow diagram illustrating an example method of changing the web cache key 402. The web application 140 may be loaded in the web browser 135 in S310. In S320, the server 110 may pass a web cache key version to the web application 140. The web application 140 may compare the passed web cache key version with the browser-stored cache key version currently stored in Local Storage. Local Storage, as used herein refers to a limited web browser 135 data store that persists with no expiration date. Data stored in Local Storage may persistent even after the web browser 135 is closed. In an embodiment, the LocalStorage data capacity may be limited to a set amount of storage, such as five, ten, or twenty megabytes or, more generally, any desired amount of storage. In an example, the passed cache key version may be lower than the browser-stored cache key version currently stored in LocalStorage. This may occur due to a software bug, a failed system component or other outage, or based on an attacker's attempts to manipulate the system. In this case, web application 140 may cease performing encryption and decryption operations in S340 because the web cache key is outdated. Alternatively, the passed web cache key may be higher than the version currently stored in LocalStorage. In this case, the web application 140 may clear the encrypted stores in the cache 145 and may overwrite the web cache key version currently stored in Local Storage with the passed version of the web cache key. Alternatively, the passed web cache key may be the same version as the version currently stored in Local Storage. In this case, web application 140 may initialize the key as a special object that may be used to encrypt and decrypt but may be unable to obtain the raw string key provided by server 110.

A syncer delegate 130 may be implemented using processor 120, for example, to improve performance of the web application 140 by utilizing the cache 145. Syncer delegate 130 may intercept read requests generated by the web application 140 and attempt to respond by transferring data from the cache 145. Alternatively, or in addition, the syncer delegate 130 may also allow the original read request to pass to the server 110 simultaneously or near-simultaneously. Server 110 may respond with data that is newer than the cached data. Based on associated version values associated with the cached data and the data from the server, syncer delegate 130 may update the cache 145, and the web application 140 may refresh its display using the data. In an embodiment, a read request from the web application 140 and forwarded by the syncer delegate 130 may include the version values of data objects stored within the cache 145, and the server 110 may respond with only data objects that are newer than those stored in the cache 145. Syncer delegate 130 may store data objects in memory 125 in addition to those data objects stored in cache 145 to avoid creating duplicate data objects when multiple portions of web application 140 or multiple instances of web application 140 are using the same data object. By maintaining separate copies of data objects in memory 125, syncer delegate 130 may be able to perform a comparison to determine when data objects have been updated. Syncer delegate 130 may also update its separate copies of data objects and intercept updates from sources other than the server 110 to update its copies of the data objects. Syncer delegate 130 may process bulk loads from the cache 145 once all required data object types are being cached. A bulk load may encompass transmitting more than one data object at a time within a single transaction. The data objects transmitted together in a bulk load may be related to a web application feature or function or otherwise used together such that web application 140 may be more likely to utilize all the data objects grouped within a bulk load together rather than individually. In an example, a bulk load may request to populate an inbox within web application 140. The bulk load request may be satisfied by transferring several data object types, including a message ID, message body, sender and recipient, attachments, and the like, within a single bulk load transfer rather than transmitting each data object within a separate transaction. Therefore, performing a bulk load transfer from cache 145 may require that each of the data object types have first been transferred to the cache to allow all the data object types to be transferred together as a group. Performing a bulk load transfer improves efficiency by reducing the procedural overhead normally associated with transferring a group of data objects. Once the cache 145 has been populated with a suitable quantity of data, requests for data from the web application 140 may be serviced preferably from the cache 145 rather than the server 110, thus improving the responsiveness and performance of the web application 140. Syncer delegate 130 may identify when the cache 145 contains stale data or is empty to avoid rendering blank or stale data views in the web application 140. The browser cookie 450 may be maintained on a per-user basis that stores a timestamp 453 indicating when the cache 145 was last updated. The server 110 and/or syncer delegate 130 may determine whether to defer data reads from the server 110 based on the timestamp 453 stored within the browser cookie 450. In an example, where the timestamp 453 indicates that the cache 145 has not been updated for a threshold time, data reads from server 110 may not be deferred to allow the cache 145 to be updated. Where the timestamp 453 indicates that the cache 145 has been updated within a threshold time, the server 110 and/or syncer delegate 130 may determine that the cache 145 is neither stale nor empty and defer data reads from the server 110. Alternatively, or in addition, each data object stored within cache 145 may be associated with a timestamp included within the database schema that indicates the date and/or time that the data object was last updated, modified, and/or created. Similarly, where the web application 140 may receive a read request, the same logic may be applied to avoid responding using data from the cache 145 if empty or the data is stale.

It may be possible in certain circumstances that a timestamp or version value for a data object becomes updated or incremented in sequence, but the data object may nevertheless be stale. When this occurs and the data object having the incorrect version value or timestamp is cached on the client device 105, the syncer delegate 130 may incorrectly determine that the newly-updated data object is the same as the cached data object and prevent the data object from being updated in the cache 145. Accordingly, the web application 140 may be unable to display and operate using the newest version of the data object until a subsequent update to the data object is made. To address this or similar issues, the syncer delegate 130 may enforce updates of the cache 145 even when the version value or timestamp is the same. Thus, assuming data objects on the server 110 include the correct version value or timestamp, the data objects in the cache 145 may not become stale and/or unable to be updated based on this potential issue.

It is also possible that the responsiveness of the web application 140 may be reduced when multiple instances of the web application 140 from multiple browser tabs attempt to perform a transaction on the same cached data object simultaneously or near-simultaneously. To address this or similar issues, in an embodiment the system may determine that a threshold number of transactions requested for a cached data object has been met and allow access to the cache 145 only for those browser tabs or web application 140 instances that are currently visible. Alternatively, or in addition, access to the cache 145 may be allowed only for those browser tabs or web application 140 instances where one or more data objects may be visible. Alternatively, or in addition, access to the cache 145 may be allowed only for requests associated with one or more data objects that are currently visible within one or more browser tabs or web application 140 instances. These techniques may reduce the total number of pending transactions for the cache 145 and promote more responsive performance of the web application 140. Delays incurred due to transferring data to and from the server 110 in background or otherwise invisible browser tabs, invisible web application 140 instances, or invisible data objects may be imperceptible to the user, and thus the user may not be inconvenienced. Syncer delegate 130 may be utilized to restrict and allow access to the cache 145 by one or more web application 140 instances.

The system 100 may support isolated application function execution environments for different tenants of a multi-tenant system. For example, by spinning up separate processors 120 on a tenant-by-tenant basis, the system 100 may not mix sensitive data for different tenants but may allow application function execution across multiple tenants.

Embodiments disclosed herein may allow for more efficient execution of applications and application functions in conjunction with a multi-tenant system than would be achievable using conventional techniques. For example, the web application 140 may be a collaboration tool designed to allow users to communicate and share data. By utilizing a cache 145 as disclosed in the present embodiment, the responsiveness of the web application 140, such as a collaboration tool, may be improved by reducing the number of requests made to one or more servers 110/115 over a network 150, as well as by reducing the dependency of the web application 140 on receiving data from one or more servers 110/115 in a timely manner in order to render views and allow transactions to be performed on the data.

Figure 5:
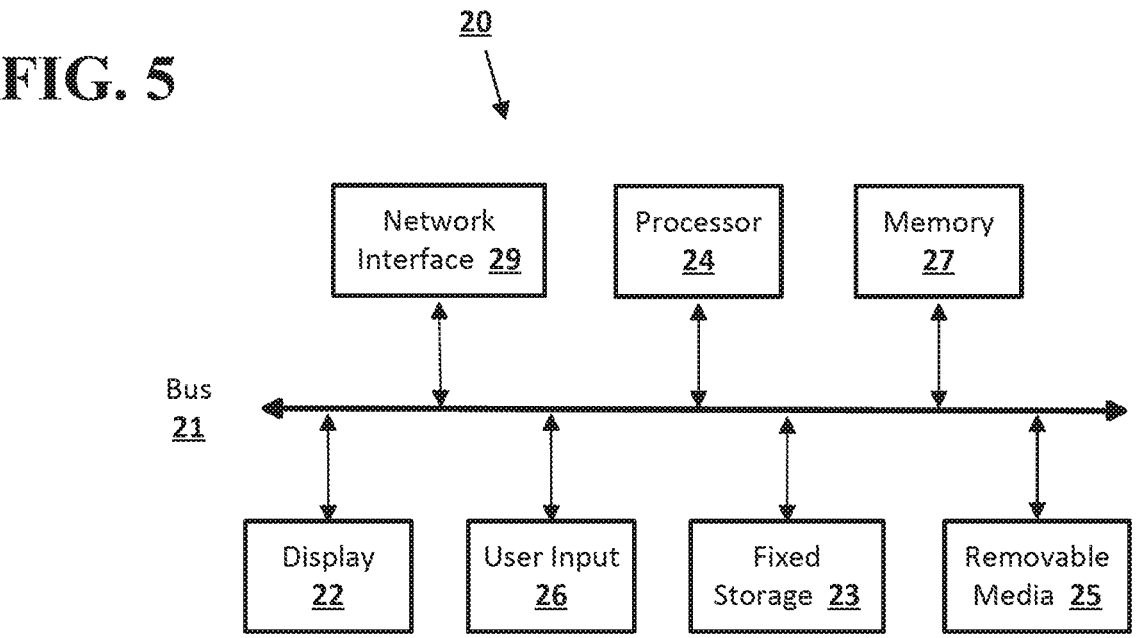
FIG. 5 illustrates a computing device according to an embodiment of the disclosed subject matter.

Embodiments of the presently disclosed subject matter may be implemented in and used with a variety of component and network architectures. FIG. 5 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 6:
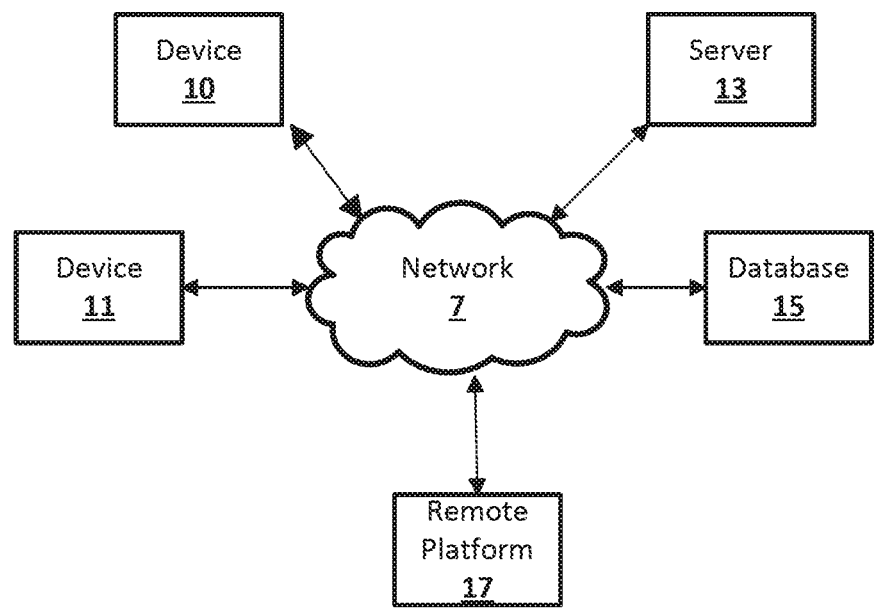
FIG. 6 illustrates a network configuration according to an embodiment of the disclosed subject matter.

FIG. 6 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 7:
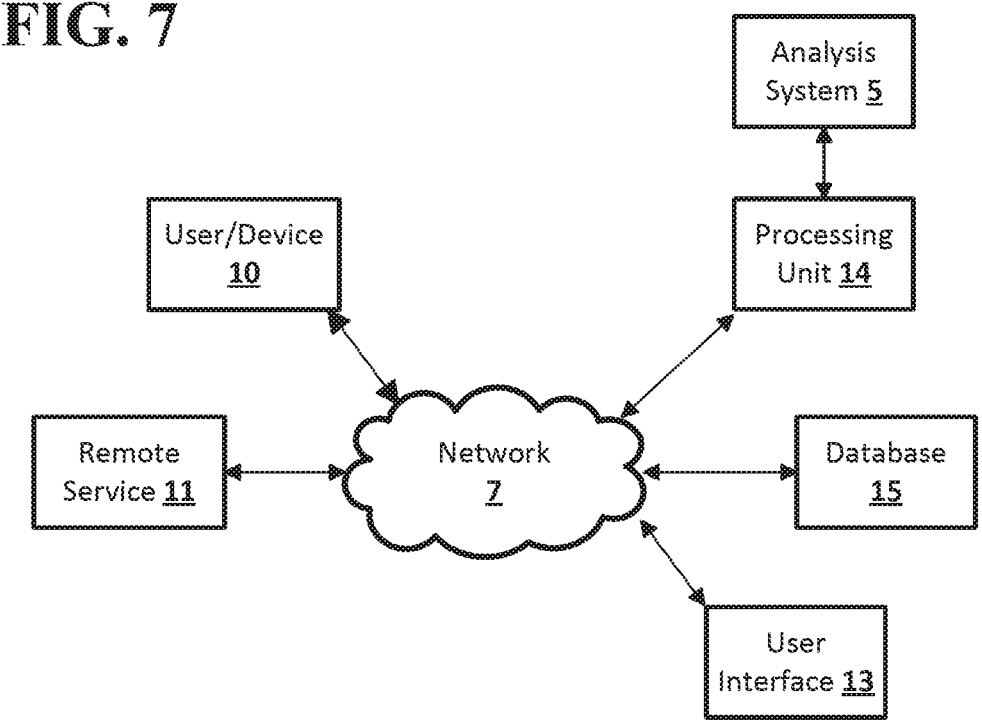
FIG. 7 illustrates an example network and system configuration according to an embodiment of the disclosed subject matter

FIG. 7 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A data-caching system comprising:
   a remote data source;
   a processor;
   a memory in communication with the processor, the memory configured to store a plurality of instructions executable by the processor to cause the system to:
   provide, by the processor, a web browser application, the web browser application configured to generate a request to receive a data object from the remote data source,
   wherein the memory is further configured to store a plurality of syncer delegate instructions executable by the processor on which the web browser is operating to cause the system to:
   intercept the request from the web browser application;
   determine whether the requested data object is available in the memory;
   simultaneously provide the requested data object from the memory to the web browser application based on the web browser application being visible at a time of generating the request and forward the request to the remote data source via a network;
   receive the requested data object from the remote data source via the network; and
   provide the received data object to the web browser application when a determination is made that the received data object is newer than the requested data object based on a timestamp that indicates when the data object in the memory was last updated and store the received data object in the memory.

2. The system of claim 1, wherein the memory is further configured to store a version attribute for each data object stored in the memory.

3. The system of claim 2, wherein the request further comprises a request for a plurality of data objects; and further comprising syncer delegate instructions to:
   include a plurality of first version attributes for the plurality of requested data objects in the request forwarded to the remote data source via the network; and
   receive only those requested data objects from the remote data source having a second version attribute that indicates a same or newer version than the first version attribute.

4. The system of claim 1, further comprising instructions to:
   generate an encryption key; and
   create a session, the session associated with a session data object that stores the encryption key, a session identifier, and a version attribute that identifies a version of the encryption key.

5. The system of claim 4, further comprising instructions to generate a browser cookie, the browser cookie comprising:
   a user ID field that identifies a current user; and
   a session ID field including the session identifier.

6. The system of claim 4, further comprising instructions to:
   transfer the encryption key from the session data object to the web browser application; and
   encrypt the received data object using the encryption key prior to storing the received data object in the memory.

7. The system of claim 5, further comprising instructions to:
   generate an encryption key;
   determine that a user ID of a current user of the web browser application matches the user ID field;
   determine that a first version attribute of a session data object that identifies a version of an encryption key matches a second version attribute that identifies a current version of the encryption key, the second version attribute stored in a data store of the web browser application; and transfer the encryption key to the web browser application.

8. The system of claim 1, wherein the remote data source is configured to transmit a first encryption key version attribute of an encryption key; and further comprising instructions to:
compare the first encryption key version attribute with a second encryption key version attribute, the second encryption key version attribute stored in a data store of the web browser application;
determine that the first encryption key version attribute reflects a more recent version of the encryption key than the second encryption key version attribute;
overwrite the second encryption key version attribute with the first encryption key version attribute; and
erase a data object encrypted using the encryption key associated with the first encryption key version attribute from the memory.

9. The system of claim 1, further comprising instructions to:
generate a browser cookie, the browser cookie comprising the timestamp that indicates when the memory was last updated; and
defer data reads from the remote data source based on the timestamp.

10. The system of claim 1, wherein the web browser application further comprises a first web browser application and a second web browser application, and further comprising instructions to:
determine that at least one of the first web browser application and the second web browser application are not currently visible to a user of the system; and
further comprising syncer delegate instructions to deny access to the memory for a request generated by at least one of the first web browser application and the second web browser application that are not currently visible to the user of the system.

11. A method comprising:
intercepting a request for a data object from a web browser application to a remote data source;
determining, on a computerized device on which the web browser application is operating, whether the requested data object is available in a memory of the computerized device;
simultaneously providing the requested data object from the memory to the web browser application based on the web browser application being visible at a time of generating the request and forwarding the request to the remote data source via a computerized communications network;
receiving the requested data object from the remote data source via the computerized communications network; and
providing the received data object to the web browser application when a determination is made that the received data object is newer than the requested data object based on a timestamp that indicates when the data object in the memory was last updated and storing the received data object in the memory.

12. The method of claim 11, wherein the memory is further configured to store a version attribute for each data object stored in the memory.

13. The system of claim 12, wherein the request further comprises a request for a plurality of data objects; the method further comprising:
including a plurality of first version attributes for the plurality of requested data objects in the request forwarded to the remote data source via the computerized communications network; and
receiving only those requested data objects from the remote data source having a second version attribute that indicates a same or newer version than the first version attribute.

14. The method of claim 11, further comprising:
generating an encryption key; and
creating a session, the session associated with a session data object that stores the encryption key, a session identifier, and a version attribute that identifies a version of the encryption key.

15. The method of claim 14, further comprising generating a browser cookie, the browser cookie comprising:
a user ID field that identifies a current user; and
a session ID field including the session identifier.

16. The method of claim 14, further comprising:
transferring the encryption key from the session data object to the web browser application; and
encrypting the received data object using the encryption key prior to storing the received data object in the memory.

17. The method of claim 11, further comprising:
generating an encryption key;
determining that a user ID of a current user of the web browser application matches the user ID field;
determining that a first version attribute of a session data object that identifies a version of an encryption key matches a second version attribute that identifies a current version of the encryption key, the second version attribute stored in a data store of the web browser application; and
transferring the encryption key to the web browser application.

18. The method of claim 11, further comprising:
transmitting a first encryption key attribute of an encryption key;
comparing the first encryption key version attribute with a second encryption key version attribute, the second encryption key version attribute stored in a data store of the web browser application;
determining that the first encryption key version attribute reflects a more recent version of the encryption key than the second encryption key version attribute;
overwriting the second encryption key version attribute with the first encryption key version attribute; and
erasing a data object encrypted using the encryption key associated with the first encryption key version attribute from the memory.

19. The method of claim 11, further comprising:
generating a browser cookie, the browser cookie comprising the timestamp that indicates when the memory was last updated; and
deferring data reads from the remote data source based on the timestamp.

20. The method of claim 11, wherein the web browser application further comprises a first web browser application and a second web browser application, and the method further comprises:
determining that at least one of the first web browser application and the second web browser application are not currently visible to a user of the system; and denying access to the memory for a request generated by at least one of the first web browser application and the second web browser application that are not currently visible to the user of the system.

* * * * *